April 12, 1966     E. P. FIRTH ETAL     3,245,274
VARIABLE RATIO TRANSMISSION MECHANISM
Filed Nov. 19, 1963     7 Sheets-Sheet 1
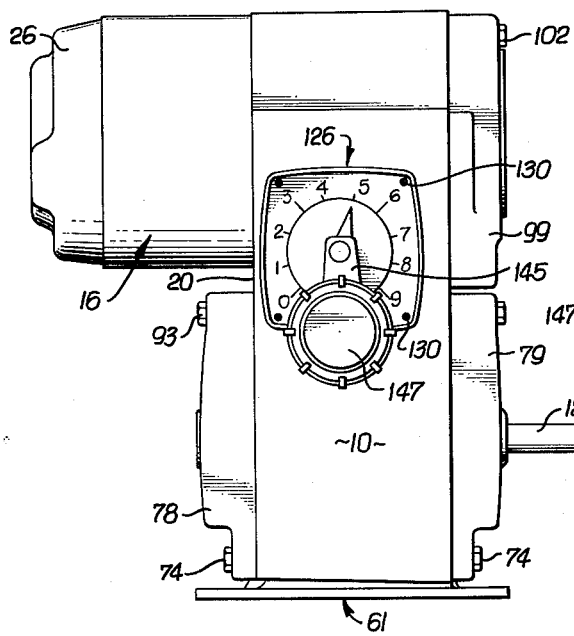
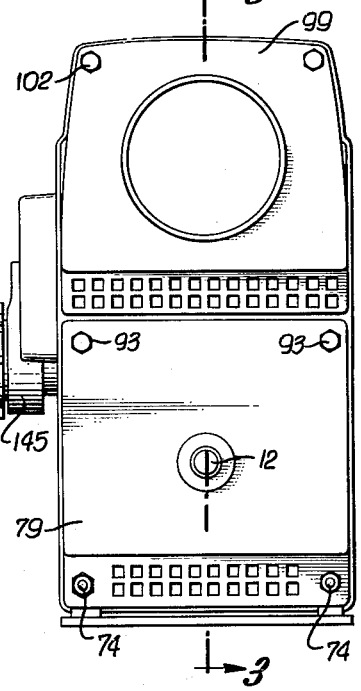
EDWARD P. FIRTH
VITO RASO
ROBERT P. THOMPSON
INVENTORS.
BY
*Flam and Flam*
ATTORNEYS.

EDWARD P. FIRTH
VITO RASO
ROBERT P. THOMPSON
INVENTORS.

BY
Flam and Flam
ATTORNEYS.

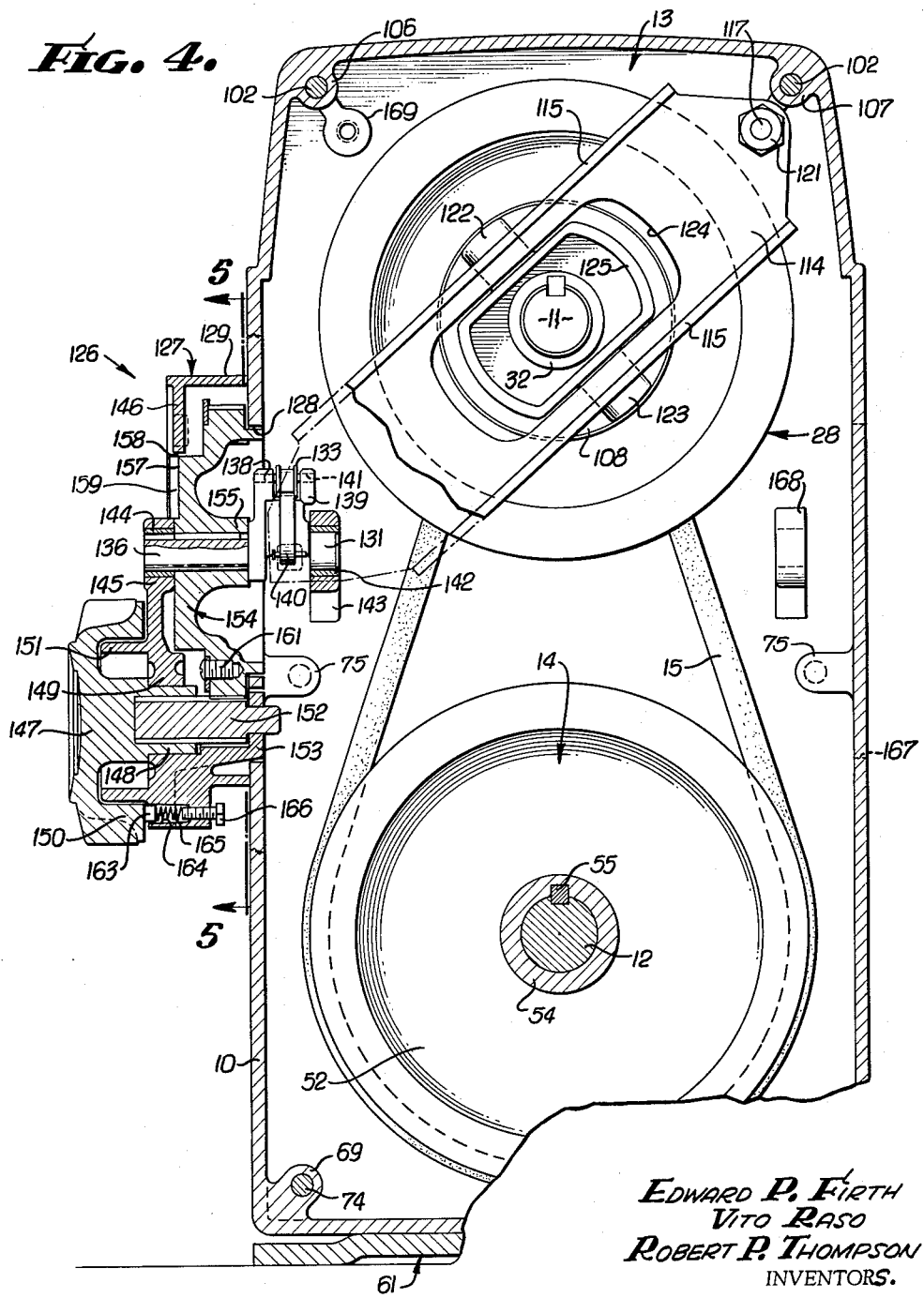

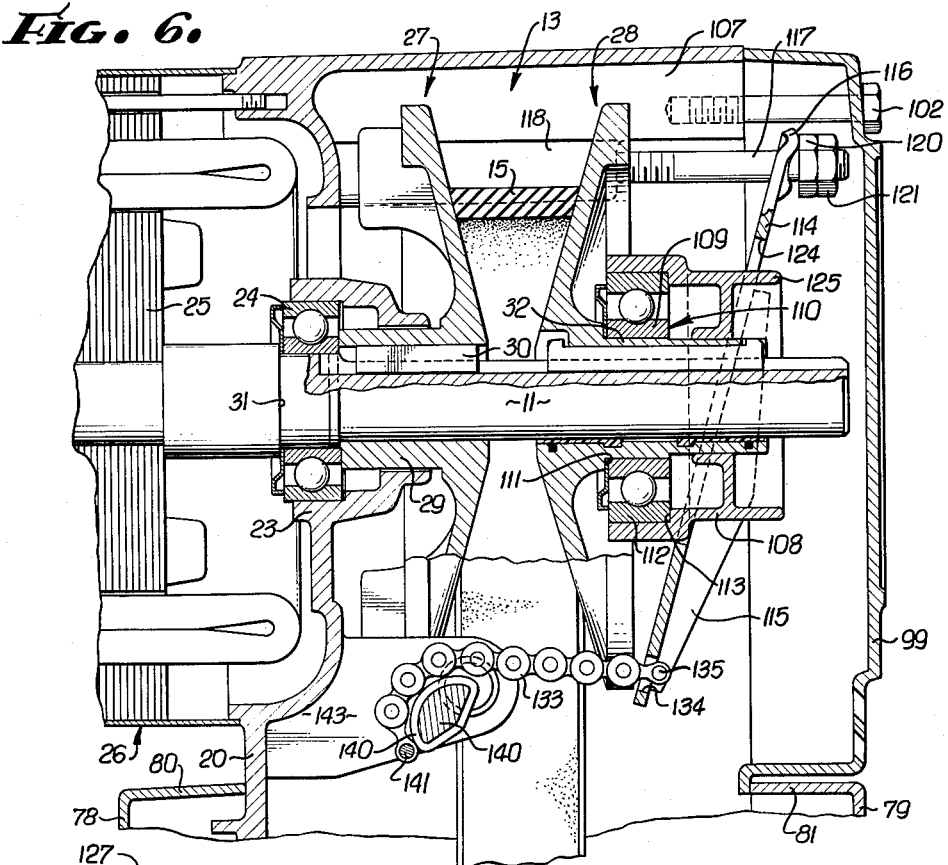

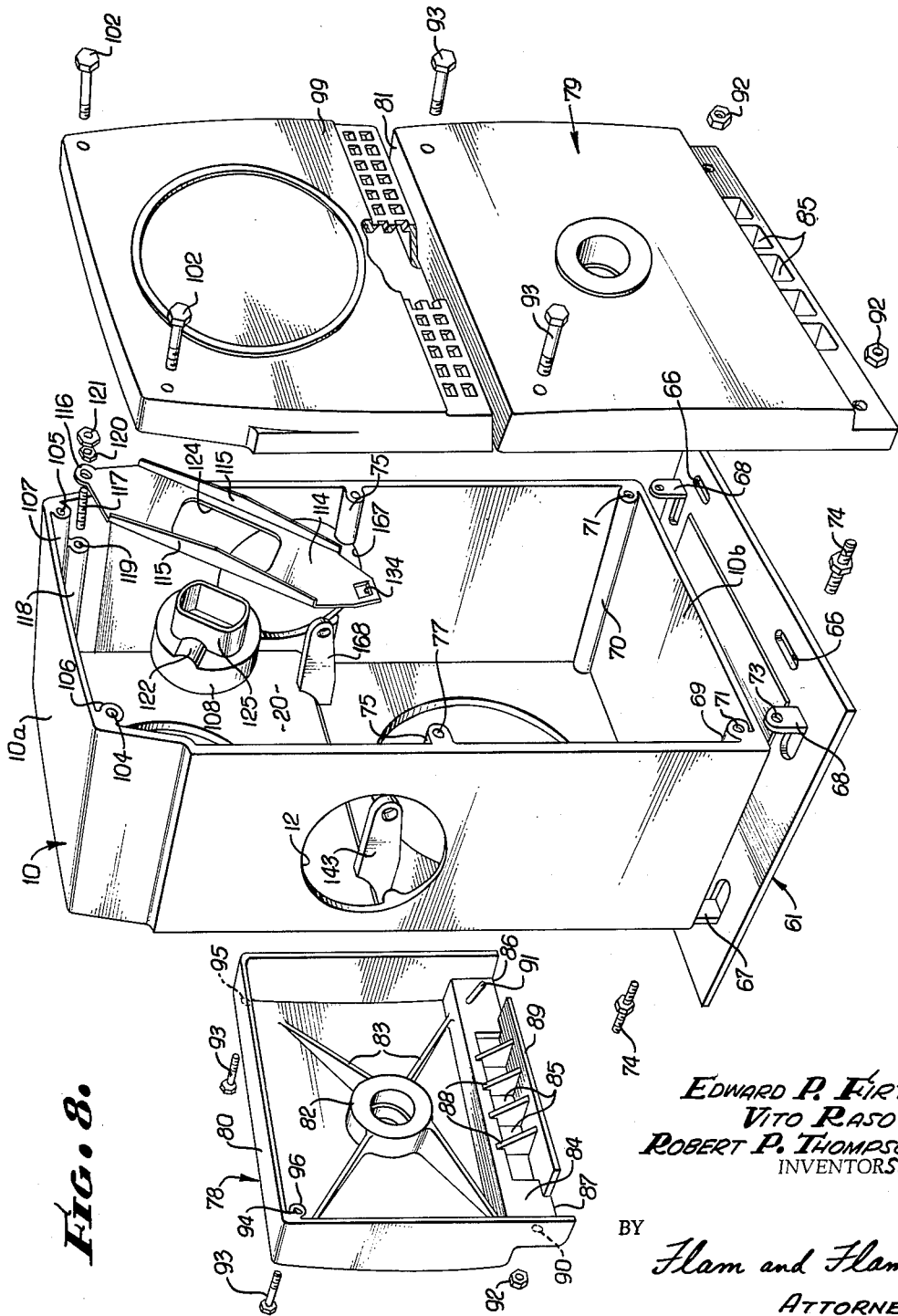

April 12, 1966   E. P. FIRTH ETAL   3,245,274
VARIABLE RATIO TRANSMISSION MECHANISM
Filed Nov. 19, 1963   7 Sheets-Sheet 6
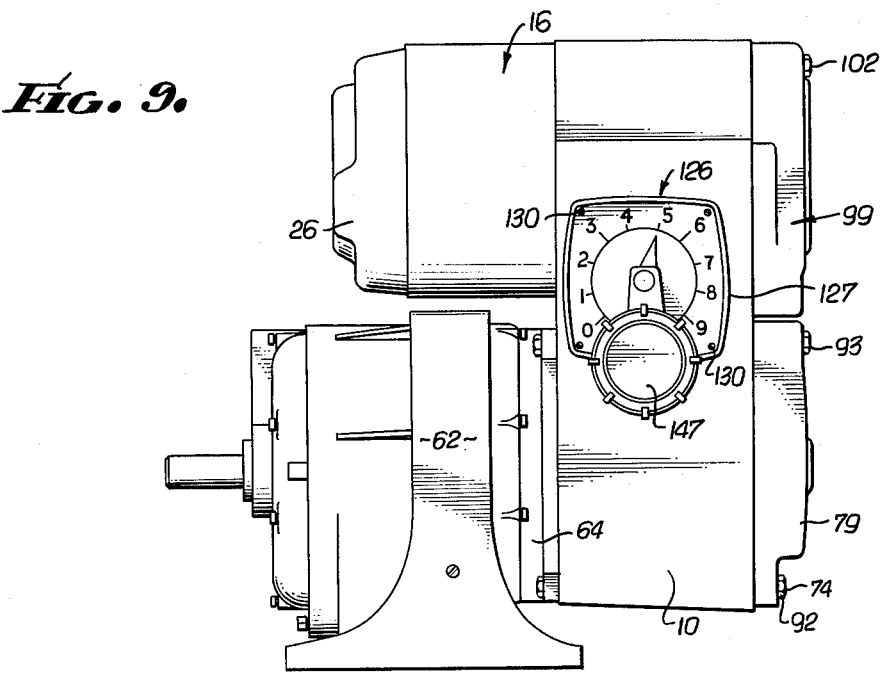
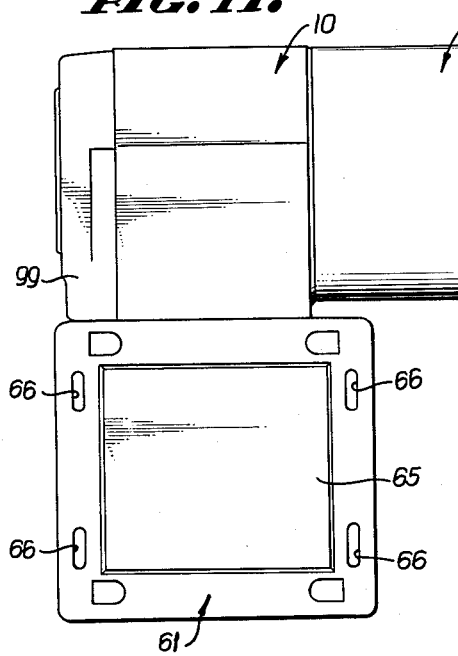
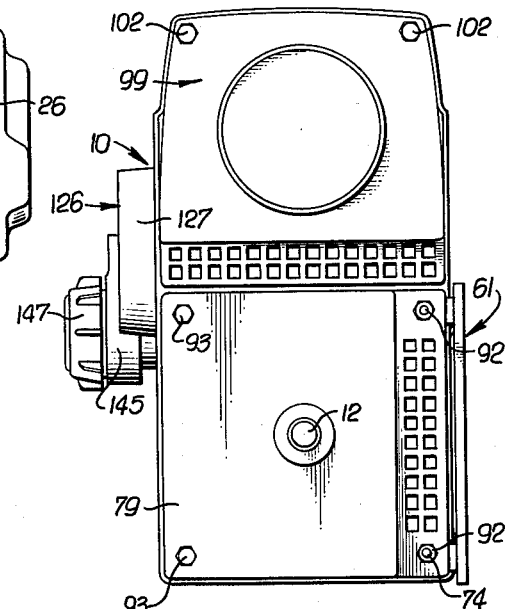
INVENTORS.
EDWARD P. FIRTH
VITO RASO
ROBERT P. THOMPSON
by Flam and Flam
ATTORNEYS.

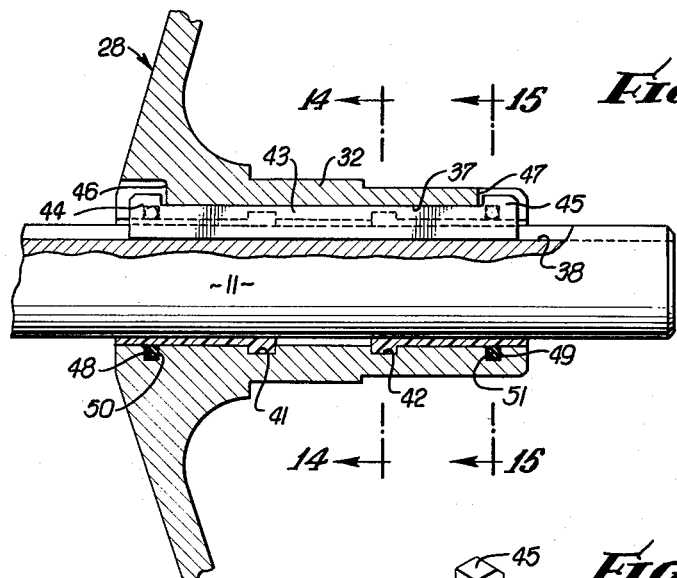
FIG. 12.
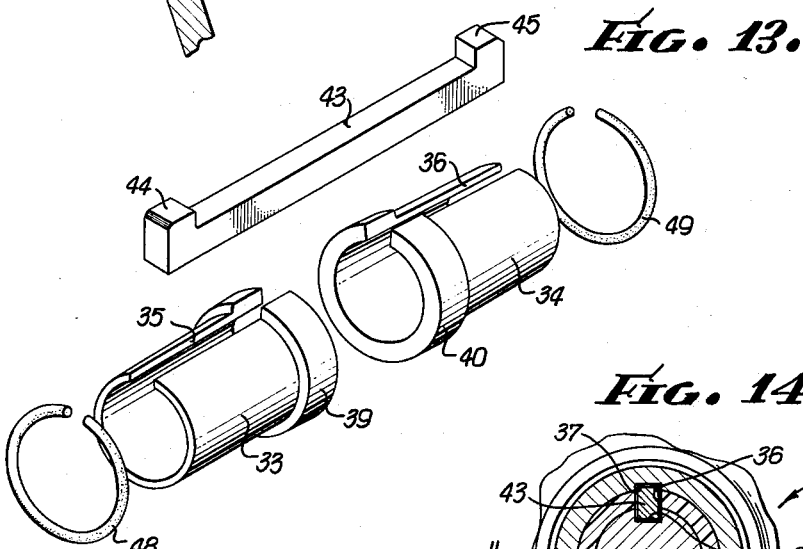
FIG. 13.
FIG. 14.
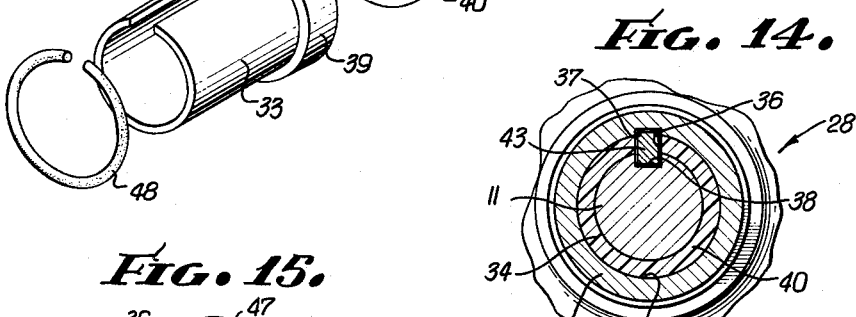
FIG. 15.
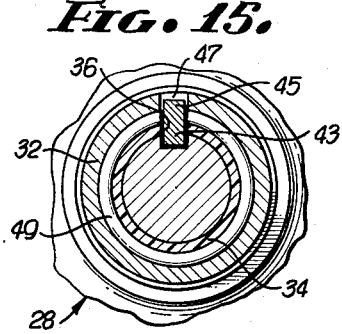
EDWARD P. FIRTH
VITO RASO
ROBERT P. THOMPSON
INVENTORS.
BY *Flam and Flam*
ATTORNEYS.

United States Patent Office 3,245,274
Patented Apr. 12, 1966

3,245,274
VARIABLE RATIO TRANSMISSION MECHANISM
Edward P. Firth, La Mirada, Vito Raso, Buena Park, and Robert P. Thompson, Lawndale, Calif., assignors to Emerson Electric Co., a corporation of Missouri
Filed Nov. 19, 1963, Ser. No. 324,639
15 Claims. (Cl. 74—230.17)

This invention relates to variable ratio transmission mechanisms utilizing variable diameter pulley structures on parallel shafts connected together by a flexible belt.

Such transmission structures have found wide application in various fields. In certain installations, the entire transmission may be supported on the case of another mechanism, as for example a right-angle drive. Thus the driven shaft of the transmission may be connected to the input shaft of the right-angle drive. In other installations, the transmission frame may be directly mounted on a floor or support. In such instances, the generally rectangular frame may be required to be upright, or cantilevered right or left in a horizontal position. In still other installations, both ends of the driven shaft may operate mechanisms, as for example a conveyor at one end and an alternator at the other. By such means, a signal measuring conveyor speed may be used at a remote station for synchronization, tension control or the like.

One of the objects of this invention is to provide a casing structure for a variable ratio transmission capable of wide application. For this purpose, the casing itself has no mounting base. Instead, a separate base is provided that attaches in such manner as to be concealed by the end brackets for the casing. Thus when the base is not used, as for example when the transmission is mounted directly to a right-angle drive, the mounting provisions for the unused base are not exposed.

Another object of this invention is to provide a transmission frame and base in which the transmission frame can selectively be mounted vertically or right or left horizontally.

Another object of this invention is to provide a transmission mechanism of this character in which the frame may be die cast. To achieve this objective, one end of the frame is entirely open. Annular registers at this end are necessarily eliminated. Instead, embossments on the inside of the frame are provided with holes cooperable with self-tapping machine screws for attaching end brackets. Annular registers at the closed end of the frame are die cast to size.

Another object of this invention is to provide bearing brackets for the driven shaft of the transmission that can be aligned axially with the driven shaft merely by their being secured to the frame by a number of studs or screws. Thus machined surfaces on the frame and the brackets for this purpose are obviated.

Still another object of this invention is to provide a bracket structure for use with the transmission frame and base that can be removed without disturbing the base.

This invention possesses many other advantages, and has other objects which may be made more clearly apparent from a consideration of one embodiment of the invention. For this purpose, there is shown a form in the drawings accompanying and forming a part of the present specification, and which drawings, unless as otherwise indicated, are true scale. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a side elevational view of a variable transmission mechanism incorporating the present invention;

FIG. 2 is an end elevational view thereof;

FIG. 4 is a fragmentary transverse sectional view taken along a plane corresponding to line 4—4 of FIG. 3;

FIG. 5 is a further enlarged transverse sectional view of the control unit taken along a plane corresponding to line 5—5 of FIG. 4;

FIG. 6 is an enlarged fragmentary axial sectional view showing a part of the apparatus illustrated in FIG. 3 and with the parts in a different position;

FIG. 7 is a fragmentary pictorial view showing some of the parts of the control unit broken away and in section;

FIG. 8 is an exploded pictorial view illustrating the various elements of the frame;

FIG. 9 is a side elevational view similar to FIG. 1, illustrating the transmission frame mounted on a gear mechanism;

FIG. 10 is an end elevational view similar to FIG. 2, but illustrating the mounting base in an alternate position;

FIG. 11 is a side elevational view of the apparatus shown in FIG. 10;

FIG. 12 is a further enlarged fragmentary axial sectional view showing the bushing structure for one of the slidable pulley elements;

Figure 3:
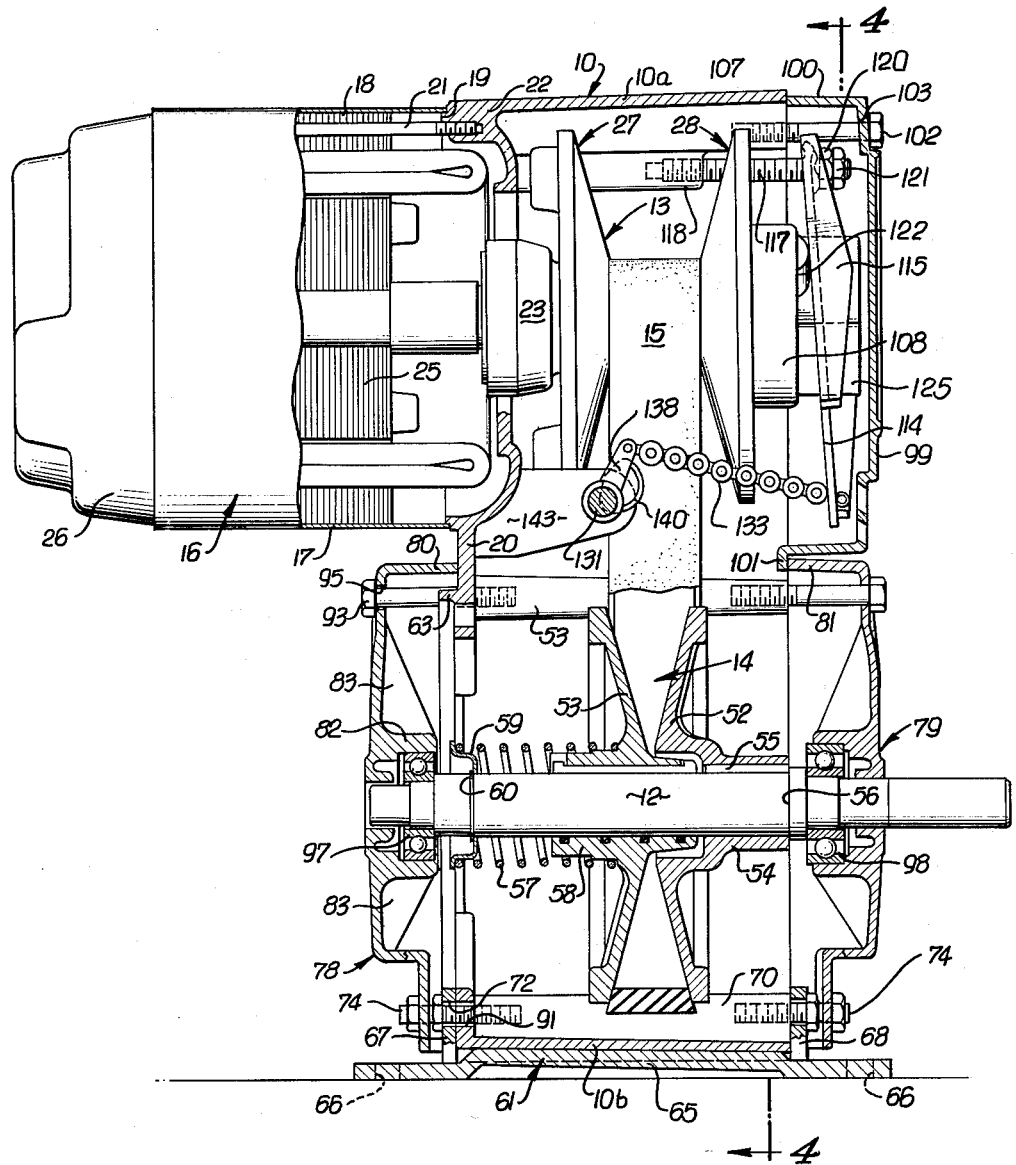
FIG. 3 is an enlarged axial sectional view taken along an offset plane corresponding to line 3—3 of FIG. 2, some of the parts being shown in elevation.

FIG. 13 is an exploded pictorial view illustrating components of the bushing structure; and FIGS. 14 and 15 are sectional views taken along planes corresponding, respectively, to lines 14—14 and 15—15 of FIG. 12.

In FIGS. 1, 2, 3, 4 and 8, there is illustrated a frame or casing 10 for a variable ratio transmission mechanism. As shown in FIGS. 4 and 8, the frame is generally of rectangular configuration, and so designed that it may be made as a die casting. For this purpose, the right-hand end of the frame 10 is entirely open. The other end of the frame 10 is partially closed in a manner hereinafter to be described. As shown in FIG. 3, the upper and lower walls 10a and 10b as well as the side walls are tapered so as to provide suitable mold draft.

A driving shaft 11 (FIGS. 3 and 6) and a driven shaft 12 (FIGS. 1 and 3) are supported for movement about spaced parallel axes in a manner hereinafter to be described. The shafts are connected together by the aid of variable diameter pulley structures 13 and 14 respectively mounted upon the shafts 11 and 12. A flexible V-belt 15 interconnects the pulley structures 13 and 14.

The shaft 11 is operated by a motor 16 cantilevered at the left-hand end of the frame 10, as viewed in FIGS. 1 and 3. The motor includes a shell 17 in which stator laminations 18 are accommodated. The shell 17 telescopes over an annular flange or register 19 formed on the left-hand end wall 20 of the frame. A series of bolts 21 engaging threaded recesses 22 on the flange 19 secure the motor 16.

A bearing cup 23 (FIGS. 3 and 6) is integrally formed at the left-hand wall of the frame. The shaft 11 projects through a bearing 24 mounted in the cup. On the outer end of the shaft a rotor 25 is mounted. A bearing structure (not shown) is mounted in an end bracket 26 at the opposite end of the motor 16. The right-hand end of the shaft, as shown in FIG. 6, is free of direct support.

The pulley structure 13 on the driving shaft 11 includes, in this instance, a pair of opposed pulley elements 27 and 28, one of which 28 is slidable along the shaft 11. The edges of the belt 15 engage the conical faces of the respective pulley elements. As the pulley sections 27 and 28 are moved toward and away from each other, the belt 15 is forced outwardly or permitted to move inwardly, thus changing the effective pulley diameter.

The left-hand pulley element 27, as shown in FIG. 6, has a hub 29 that fits the shaft 11. A key 30 establishes a driving connection between the shaft 11 and the pulley element 27. The hub 29 projects into the bearing cup 23 and abuts the inner race of the bearing 24. The inner race of the bearing 24 in turn abuts a shoulder 31 formed on the shaft 11.

The right-hand pulley element 28 has a hub 32 shown in detail in FIG. 12. Located between the hub 32 and the shaft 11 are companion flexible bushings 33 and 34 similar to those shown and described in the application of Vito Raso et al., Serial No. 140,520, filed September 25, 1961, now Patent No. 3,138,032, and entitled "Axially Adjustable Drive Mechanism." The bushings 33 and 34 may be made of Nylatron, Delrin or other material having a relatively low coefficient of friction with respect to the metal of the shaft 11. The bushings 33 and 34 respectively have axially extending slots 35 and 36 capable of alignment with keyways 37 and 38 respectively formed on the interior surface of the hub 32 and the exterior surface of the shaft 11.

The bushing structures 33 and 34 are received in opposite ends of the hub 32. Their inner ends have integral collars 39 and 40 that are keyed in annular internal recesses 41 and 42 of the hub 32. A key 43 made of metal or plastic is accommodated in the keyways 37–38 and extends through the slots 35 and 36. The key 43 is locked to the hub 32. For this purpose, enlarged ends 44 and 45 of the key 43 project into recesses 46 and 47 at opposite ends of the hub 32.

The bushings 33 and 34 may be compressed so as to enable the collars 39 and 40 to enter the bore of the hub 32 and to snap into the recesses 41 and 42. The bushings 33 and 34 are sufficiently flexible so as to permit their constriction for purposes of assembly. Yet the bushings may have resilient characteristics so that their expanding force normally keeps them in place. However, in order to ensure a close fit of the bushings on the shaft 11 thus to hold the pulley element 28 against tilting or any movement relative to the shaft 11 except in an axial direction, the bushings 33 and 34 are constricted about the shaft 11. For this purpose, split O-rings 48 and 49 are provided. These O-rings, which may be made of rubber-like material such as neoprene or of other suitable material, are accommodated in internal grooves 50 and 51 at opposite ends of the bore of the hub 32. The normal diameter of the rings 48 and 49 is slightly greater than the depth of the respective grooves 50 and 51. Accordingly, the rings 48 and 49 provide a constricting force on the bushings 33 and 34, thus ensuring a close fit between the pulley element itself and the shaft 11. The split in the rings 48 and 49 allows for passage of the key 43, as shown in FIG. 15. The rings 48 and 49 may be located at other positions along the bushings or additional rings may be provided if desired.

The manner in which the pulley section 38 is moved axially will be described hereinafter.

The driven shaft 12, as shown in FIG. 3, has pulley elements 52 and 53. The right-hand pulley element 52 has a hub 54 that fits the shaft 12 and is coupled thereto, as by a key 55. The right-hand end of the hub 54 abuts a shoulder 56 formed on the shaft 12. The left-hand pulley structure 53 is mounted by a two-part bushing similar to that described in connection with the pulley element 28. A compression spring 57, which surrounds both the shaft 12 and the hub 58 of the pulley element 53, urges the pulley element 53 toward the companion pulley element 52. A spring retainer 59 that abuts a snap ring 60 mounted upon the shaft 12 forms a seat for the spring 57. In a well-understood manner, the pulley section 53 automatically adjusts to the setting of the pulley elements 27 and 28 on the driving shaft 11.

The frame 10 itself has no base, mounting flange or mounting brackets. It may be mounted upon a separate base 61 or it may be mounted, as illustrated in FIG. 9, upon auxiliary equipment, such as a right-angle drive 62. The left-hand end wall 20 of the frame 10, as shown in FIG. 3, is provided with an annular flange or register 63 coaxial with the shaft 12. This flange 63 may be received within an annular groove formed on the frame 64 of the auxiliary mechanism 62 shown in FIG. 9. In a well-understood manner, the driven shaft of the variable ratio transmission mechanism is coupled to the input shaft of the auxiliary mechanism 62.

The angular position of the frame 10 about the auxiliary mechanism 62 may be adjusted.

In other installations, such as depicted in FIGS. 1 to 7, it may be desirable independently to mount the frame 10. The base 61 accomplishes this result. The base 61, which may be made of steel, is generally rectangular in configuration, as shown in FIG. 8. It has a central pad 65 (see also FIG. 3) that slopes slightly relative to the plane of the base 61. The end wall 10b rests upon the inclined pad 65. The plate 61 has a series of elongated apertures 66 (FIG. 8) through which suitable mounting bolts can be passed so as to secure the base to a suitable support.

The base 61 has four stamped-out projections or ears located beyond the corners of the pad 65. Two of the ears 67 overlie the edges at the left-hand lower corners of the frame 10, and the other two ears 68 overlie the edges at the right-hand open end of the frame 10.

Extending along the corners within the frame 10 are bosses 69 and 70. These bosses 69 and 70 have apertures 71 at opposite ends accessible at the end wall 20 and the opening of the frame. These apertures 71 are capable of registry with apertures 72 and 73 of the ears 67 and 68, respectively. By the aid of hex-collared studs, as at 74, the frame 10 is secured to the base 61.

Two bosses 75 and 76 extend along the interior of the frame at the mid-level thereof and have apertures 77 at opposite ends accessible, respectively, at the end wall 20 and the opposite open end of the frame. The apertures 77 and 71 at each end of the machine are located at corners of a square. Thus it is possible to mount the frame on a base not only in the vertical position illustrated in FIGS. 1 to 8, but also in either a right- or left-hand horizontal orientation. A right-hand orientation is depicted in FIGS. 13 and 14.

The apertured bosses 69, 70, 75 and 76 mount bearing brackets 78 and 79 for opposite ends of the driven shaft 12. The brackets 78 and 79 are identical and may be made from the same casting. They are generally of square configuration. The end brackets 78 and 79 have peripheral flanges 80 and 81 adapted to abut the ends of the frame 10.

The inside of one of the brackets 78 is shown clearly in FIG. 8. A bearing cup 82 is located at the center of the bracket 78 on the inside thereof. Ribs 83 reinforce the cup. One side of the bracket has an inwardly offet angular wall 84 along which ventilating openings 85 are situated. The edges of the flange 80 are arrayed substantially as a square, there being slots 86 and 87 at the corners of the flange along the offset wall 84. Ribs 88 define the separation between the ventilating openings 85 and serve to support the flange section 89 located between the slots 86 and 87.

The edges of the bracket 78 abut the end wall 20 and circumscribe the register or flange 63 which, in this instance, is unused. The lugs or ears 67 of the base 61 project through the slots 86 and 87 so as to be concealed by the bracket 78.

The hex-collared studs 74, which project outwardly from the bosses 69 and 70, pass through apertures 90 and 91 in the vertical portion of the offset wall 84. Nuts 92 secure the bracket to the hex-collared studs 74.

Cap screws 93 (see, for example, FIGS. 1 and 3) pass through apertures 94 ano 95 at the other two corners of the bracket 78 and engage the apertures 77 of the frame.

The center of the bearing cup 82 must be accurately located in order suitably to align the driven shaft 12. For this purpose, the apertures 77 and 71 in the bosses are accurately located. The aperture 94 at one corner of the bracket 78 is extended through a boss 96 (FIG. 8) located along the corner of the flange 80. The boss 96 has an end surface adapted to abut the wall 20 about the corresponding aperture 77. Thus the aperture 94 has a substantially axial extent and it is sized so as guidingly to fit the shank of the bolt 93. Accordingly, one corner of the bracket is accurately located on the frame.

The aperture 91 opposite the boss 96 is elongated along the line joining the center of the bearing cup 82 and the center of the aperture 94. The width of the slot is carefully sized so as closely to fit the end of the corresponding stud 74. The aperture 91 thus ensures precise alignment of the center of the bearing cup 82. The screw 93 for the aperture 95 and the nut for the end of the stud 74 at the opposite corner are readily positioned and serve firmly to clamp the bracket in place.

The opposite bracket 79, instead of engaging an end wall, has the edges of its flange 81 engaging along the edges at the open end of the case or frame 10. The bracket 79 is accurately located in an identical manner, and the shaft 12 is thus accurately positioned by bearing structures 97 and 98 (FIG. 3) accommodated in the cups of the bearing brackets 78 and 79. The bracket 79 conceals the ears 68 of the mounting base 61.

The bracket 79 covers only about half of the frame opening. In order to complete the enclosure thereof, a cap 99 is provided. The cap 99 has a peripheral flange 100, three sides of which fall along the side and top edges at the open end of the frame 10. The fourth side of the flange 100 is extended to provide a lip 101 caught by the edge of the flange 81 of the bracket 79. Machines screws 102 extend through apertures 103 in the upper corners of the cap 99 and enter apertures 104 and 105 (FIG. 8) formed in bosses 106 and 107 at the upper corners of the frame 10. The enclosure for the frame is thus completed.

For a right-hand or left-hand mounting of the frame on the base 61 and as shown in FIGS. 10 and 11, brackets 78 and 79 are turned ninety degrees so that the slots, as at 86 and 87, encompass the ears 67 and 68 of the base.

In order to adjust the transmission mechanism, the pulley element 28 carries a shift collar 108 (FIGS. 3 and 6). The shift collar 108 is telescoped over the hub 32. The inner race 109 of a ball bearing structure 110 is mounted upon the hub 32 and in abutting engagement with a shoulder 111. The outer race 112 of the bearing 110 is accommodated in an enlarged opening at the left-hand end of the collar 108 and in abutting relationship with an oppositely facing shoulder 113 formed therein. Thus, by virtue of the bearing structure 110, the shift collar 108 may be non-rotary; yet a connection between the collar and the pulley element 28 is established for its axial movement.

In order to increase the diameter of the pulley structure 13, the collar 108 is moved to the left. The thrust is so transmited through the bearing structure 110 and the flexible belt 15 is caused accordingly to move. By relieving the thrust on the collar 108, the tension of the belt 15 causes the pulley element 28 to move to the right.

In order to control the movement of the collar 108, a shift lever 114 is provided. The lever 114 has reinforcing flanges 115 along oposite sides. One end of the lever has a apertured bearing projection 116 that forms a fulcrum for the lever 114. The projection 116 is mounted upon an outwardly extending stud 117 located at one of the upper corners of the frame 10. A supplemental boss 118, parallel to and terminating inwardly of the boss 107, provides an aperture 119 for mounting the stud 117. The apertured projection 116 bears against the inner surface of a nut 120 held in place by a lock nut 121. The lever 114 extends diagonally downwardly from the upper fulcrum corner, as illustrated in FIG. 4, and the central portion of the lever engages outwardly facing bearing projections 122 and 123 formed on the shift collars 108 on opopsite sides of the axis of the shaft 11. The end of the lever 114 opposite the fulcrum 116, by means presently to be described, is moved inwardly or permitted to move outwardly, thus causing the shift collar 108 to adjust the pulley structure 113.

The shift lever 114 terminates adjacent the side wall opposite that at which it is fulcrumed. This end is movable between the positions illustrated in FIGS. 3 and 6, respectively. When the shift lever 114 is moved outwardly, as in FIG. 3, the pulley has a minimum effective diameter and the end of the lever is located in the cap 99. When the lever 114 is moved inwardly to the position of FIG. 6, the diameter of the pulley structure 13 is maximum and the end of the lever has moved inwardly along the side wall of the frame 10.

The bearing projections 122 and 123 are maintained substantially in appropriate angular position on opposite sides of the lever 114. For this purpose and for the purpose of holding the lever in its diagonal operative position, the collar 108 has a non-circular flange 125 that projects with slight clearance through a corresponding non-circular aperture 124 in the center of the lever 114. The collar 108 and the lever 114 are thus mutually restrained.

In order to move the lever 114, a control unit 126 (FIGS. 1, 4, 5 and 7) is provided. The control unit 126 includes a housing structure 127 that is secured about an aperture 128 in the side wall of the frame 10. This aperture is located substantially at the center of the frame about midway between the levels of the driving shaft 11 and the driven shaft 12. The center of the aperture 128 is located beyond the inward terminus of the path of movement of the end of the shifting lever 114.

The housing structure 127, as shown in FIGS. 1 and 5, is generally square. It has a peripheral flange 129 that engages the surface of the side wall of the frame 10 about the opening 128 and is fastened therto by the aid of a plurality of screws 130 (FIGS. 1 and 5).

A crankshaft 131 serves to move the shift lever 114. Thus the crankshaft 131 has an intermediate crank portion 132 in which one end of a sprocket chain 133 is secured. The other end of the sprocket chain 133 passes through a small square aperture 134 in the shift lever 114 (FIG. 7). A pin 135 passing through the end link of the chain secures the chain to the lever 114. The chain 133 extends along the inside of the frame 10 with suitable clearance.

The crankshaft 131 may be made as a die cast unit. The crankshaft 131 has two shaft parts 136 and 137 that are spaced from each other and joined by the crank part 132. The crank part 132 includes spaced ears 138 and 139 respectively attached to the shaft parts 136 and 137. A cam or toothless sprocket 140 is located between the ears 138 and 139 with its base and is integrally joined thereto. The end link of the sprocket chain 133 has its spacer collar and pin removed so that the parts of the end link are received within slots formed between the cam or toothless sprocket 140 and the respective ears 138 and 139. A pin 141 (FIGS. 3 and 4) is accommodated in both ears 138 and 139 and passes through the parts of the end link as well as through the cam part 140 to establish a suitable connection.

As illustrated in FIG. 6, the sprocket chain 133 wraps about the surface of the cam part 140 as the crankshaft 131 is rotated in a counterclockwise direction. The distance of the cam part from the axis of the crankshaft 131 is maximum at the place of connection of the chain 133. This distance gradually reduces. The configuration of the cam may be designed that the ratio of transmission may be any desired function of angular position of the crankshaft 131. For example, a linear relationship may be achieved.

The crankshaft part 137 is received in a bushing 142 in turn mounted in an arm 143 (see FIGURE 3) projecting inwardly from the end wall 20 of the frame. The other part 136 of the crankshaft is extended axially and is mounted in a bearing bushing 144 in turn carried in an embossment 145 on the frontal wall 146 of the control unit housing 127.

In order to operate the crankshaft 131, a knob 147 (FIG. 4) is provided. The knob 147, which may be of die cast construction, has a reduced hub 148 that is journalled in an apertured boss 149 (see also FIG. 7) formed in the front wall 146 below the boss 145. The knob 147 has a peripheral flange 150 (FIG. 4) that telescopes over an outwardly projecting flange 151 formed on the housing 127.

Press-fitted in the hub 148 of the knob 147 is a pinion 152. The reduced end of the pinion 152 is journalled in an inwardly extending wall portion 153 (see also FIG. 5) of the housing 127. Ends of the teeth of the pinion 152 interfit grooves formed in the end of the knob hub 148 in order to establish a rotary coupling therebetween. A gear 154 is mounted in the housing 127 behind the frontal wall 146 and upon the crankshaft part 136 meshes with the pinion 152. The gear 154, which may also be die-cast construction, has a hub 155 keyed to the crankshaft part 136.

The angular position of the crankshaft 136 determines the setting of the variable ratio transmission mechanism. For purposes of indicating this setting, the gear 154 has a frontal surface 157 visible at a generally circular aperture 158 formed in the front wall 146 of the housing 127 about the boss 145. This surface 157 of the gear has a recess 159 (see also FIGS. 1 and 7) formed as a pointer to cooperate with scale markings on the housing wall 146 about the aperture 158.

In order to calibrate the indicator, the fulcrum point of the lever 148 may be shifted, as by adjustment of the nuts 120 and 121. For purposes of initial adjustment, the belt 15 is permitted to move to the minimum diameter position where it still adequately engages the pulley elements. The pointer is set at the zero scale mark. With all of the slack of the chain 133 taken up, the fulcrum point of the lever 144 is determined and set.

In order to prevent the belt from moving inwardly of the pulley structures beyond the minimum setting, a stop ring 160 is provided. The stop ring 160 is secured to the side face of the gear 154 by the aid of a plurality of clamping screws 161 (see FIGS. 4 and 7). The ring 160 has a projection 162 that extends above the root diameter of the teeth of the gear 146 and thus in a position to engage the teeth of the pinion 152 upon rotation of the gear 154. Thus the limit of movement of the gear is determined.

In order to maintain the setting determined by the knob 147 against creep, as for example induced by vibration, a small friction plug 163 is accommodated in an outwardly facing recess 164 in the lower wall 153 of the housing 147. The surface of the flange knob 150 is opposed to the recess 164 so as to be engaged by the plug 163. A small compression spring 165 in the recess urges the plug outwardly and to engage the knob 147. The screw 166, accessible behind the wall 153, adjusts the tension of the spring 165.

The control unit 126 can be mounted at either side of the frame 10, depending upon the requirements of the particular installation. For this purpose, an aperture 167, shown in dotted lines in FIG. 4, may be provided. A bearing arm 168 is provided in the frame casting for use, in this instance, for mounting the crankshaft. In this instance, the arm 143 will be idle. The shifting lever 114 is then mounted at the opposite upper corner of the frame 10, as at an apertured embossment 169. In this instance, the crankshaft 131 is angularly shifted through an angle of 180° relative to the gear 154. The gear 154 may be provided with two keyways for purposes of such selection. In either installation, clockwise movement of the crankshaft 131 decreases speed; hence the dials and pointer operate appropriately in both cases.

The inventors claim:

1. In a variable ratio transmission having a driving shaft and a driven shaft parallel to and spaced from the driving shaft, variable diameter pulley structures mounted on the shaft and felt means connecting the pulley structures: a frame having peripheral walls encompassing both of said shafts, said peripheral walls including side wall portions and top and bottom wall portions; said wall portions having edges defining an opening at one end of the frame for access to the pulley structures of both shafts; said frame having an end wall opposite the opening; said end wall having means for supporting a driving motor in alignment with the driving shaft; a separate mounting base for the frame; means for optionally securing the base along the bottom wall portion or along either side wall portion of the frame; said end wall having an annular register in alignment with the driven shaft cooperable with auxiliary equipment for mounting the frame independently of the base; and a pair of bearing brackets for the driven shaft, one of the brackets being attached to the end wall and concealing said register, and the other of said brackets abutting said edges and closing part of said opening.

2. In a variable ratio transmission having a driving shaft and a driven shaft parallel to and spaced from the driving shaft, variable diameter pulley structures mounted on the shaft and belt means connecting the pulley structures: a frame having peripheral walls encompassing both of said shafts, said peripheral walls including side wall portions and top and bottom wall portions; said wall portions having edges defining an opening at one end of the frame for access to the pulley structures of both shafts; said frame having an end wall opposite the opening; said end wall having means for supporting a driving motor in alignment with the driving shaft; a separate mounting base for the frame extending along one of said wall portions; said base having projections extending along said edges and along said wall means; means for attaching the base projections to the frame; and bearing brackets for the driven shaft; one of said brackets extending over one portion of said end wall, the other of said brackets covering a portion of said opening at the area of said driven shaft; said brackets concealing said projections.

3. In a variable ratio transmission having a driving shaft and a driven shaft parallel to and spaced from the driving shaft, variable diameter pulley structures mounted on the shaft and belt means connecting the pulley structures: a frame having peripheral walls encompassing both of said shafts, said peripheral walls including side wall portions and top and bottom wall portions; said wall portions having edges defining an opening at one end of the frame for access to the pulley structures of both shafts; said frame having an end wall opposite the opening; said end wall having means for supporting a driving motor in alignment with the driving shaft; a separate mounting base for the frame extending along one of said wall portions; said base having projections extending along said edges and along said wall means; means for attaching the base projections to the frame with the base extending along the bottom wall portion or along either side wall portion; and bearing brackets for the driven shaft; one of said brackets extending over one portion of said end wall, the other of said brackets covering a portion of said opening at the area of said driven shaft; said brackets concealing said projections.

4. In a variable ratio transmission having a driving shaft and a driven shaft parallel to and spaced from the driving shaft, variable diameter pulley structures mounted on the shaft and belt means connecting the pulley structures: a frame having peripheral walls encompassing both of said shafts, said peripheral walls including side wall portions and top and bottom wall portions; said wall portions having edges defining an opening at one end of the frame for access to the pulley structures of both shafts; said frame having an end wall opposite the opening; said end wall having means for supporting a driving motor in alignment with the driving shaft; said frame having a set of four exteriorly accessible apertures at said end wall and a set of four apertures at said wall edges; said sets of apertures each being arrayed as corners of a square with two of the corners of the square located at the corner of the frame between the bottom wall portion and the side wall portions; a separate mounting base for the frame having projections adapted to overlie a selected two of the apertures of one of said sets and the corresponding two of the apertures of the other of said sets; means for fastening the projections at said apertures; and bearing brackets for the driven shaft, one of said brackets extending over one portion of said end wall, the other of the brackets covering a portion of said opening at the area of said driven shaft; said brackets concealing said projections.

5. In a variable ratio transmission having a driving shaft and a driven shaft parallel to and spaced from the driving shaft, variable diameter pulley structures mounted on the shaft and belt means connecting the pulley structures: a frame having peripheral walls encompassing both of said shafts, said peripheral walls including side wall portions and top and bottom wall portions; said wall portions having edges defining an opening at one end of the frame for access to the pulley structures of both shafts; said frame having an end wall opposite the opening; said end wall having means for supporting a driving motor in alignment with the driving shaft; said frame having a set of four exteriorly accessible apertures at said end wall and a set of four apertures at said wall edges; said sets of apertures each being arrayed as corners of a square with two of the corners of the square located at the corner of the frame between the bottom wall portion and the side wall portions; a separate mounting base for the frame having projections adapted to overlie a selected two of the apertures of one of said sets and the corresponding two of the apertures of the other of said sets; studs mounted at the selected apertures, means carried by the studs for clamping the projections against the frame; bearing brackets for the driven shaft, one of said brackets extending over one portion of said end wall, the other of the brackets covering a portion of said opening at the area of said driven shaft; said brackets concealing said projections; and means for securing the brackets by the aid of said studs and by the aid of bolts cooperable with the remaining apertures of said sets.

6. In a variable ratio transmission having a driving shaft and a driven shaft parallel to and spaced from the driving shaft, variable diameter pulley structures mounted on the shaft and belt means connecting the pulley structures: a frame having peripheral walls encompassing both of said shafts, said peripheral walls including side wall portions and top and bottom wall portions; said wall portions having edges defining an opening at one end of the frame for access to the pulley structures of both shafts; said frame having an end wall opposite the opening; said end wall having means for supporting a driving motor in alignment with the driving shaft; a separate mounting base for the frame extending along one of said wall portions; said base having projections extending along said edges and along said wall means; means for attaching the base projections to the frame; and bearing brackets for the driven shaft; one of said brackets extending over one portion of said end wall, the other of said brackets covering a portion of said opening at the area of said driven shaft; said brackets concealing said projections; said end wall having an annular register cooperable with auxiliary equipment for mounting the frame independently of said base; said annular register being normally concealed by the corresponding bracket.

7. In a variable ratio transmission having a driving shaft and a driven shaft parallel to and spaced from the driving shaft, variable diameter pulley structures mounted on the shaft and belt means connecting the pulley structures: a frame having peripheral walls encompassing both of said shafts, said peripheral walls including side wall portions and top and bottom wall portions; said wall portions having edges defining an opening at one end of the frame for access to the pulley structures of both shafts; said frame having an end wall opposite the opening; said end wall having means for supporting a driving motor in alignment with the driving shaft; a separate mounting base for the frame extending along one of said wall portions; said base having projections extending along said edges and along said wall means; means for attaching the base projections to the frame; and bearing brackets for the driven shaft each having peripheral flanges, the flange of one of said brackets abutting the said end walls, and the flange of the other of said brackets abutting said edges, said flanges having slots through which said projections extend.

8. In a variable ratio transmission having a driving shaft and a driven shaft parallel to and spaced from the driving shaft, variable diameter pulley structures mounted on the shaft and belt means connecting the pulley structures: a frame having peripheral walls encompassing both of said shafts, said peripheral walls including side wall portions and top and bottom wall portions; said wall portions having edges defining an opening at one end of the frame for access to the pulley structures of both shafts; said frame having an end wall opposite the opening; said end wall having means for supporting a driving motor in alignment with the driving shaft; said frame having a set of four exteriorly accessible apertures at said end wall and a set of four apertures at said wall edges; said sets of apertures each being arrayed as corners of a square with two of the corners of the square located at the corner of the frame between the bottom wall portion and the side wall portions; a separate mounting base for the frame having projections adapted to overlie a selected two of the apertures of one of said sets and the corresponding two of the apertures of the other of said sets; studs mounted at the selected apertures, means carried by the studs for clamping the projections against the frame; bearing brackets for the driven shaft, one of said brackets extending over one portion of said end wall, the other of the brackets covering a portion of said opening at the area of said driven shaft; and means for securing the brackets by the aid of said studs and by the aid of bolts cooperable with the remaining apertures of said sets, said brackets having slots in which the projections are received; said brackets being mounted in a selected position in accordance with the position of the base.

9. In a variable ratio transmission having a driving shaft and a driven shaft parallel to and spaced from the driving shaft, variable diameter pulley structures mounted on the shaft and belt means connecting the pulley structures: a frame having peripheral walls encompassing both of said shafts, said peripheral walls including side wall portions and top and bottom wall portions; said wall portions having edges defining an opening at one end of the frame for access to the pulley structures of both shafts; said frame having an end wall opposite the opening; said end wall having means for supporting a driving motor in alignment with the driving shaft; said frame having two threaded fastening elements located at the corners of the frame at the juncture of the bottom wall portion and the side wall portions, said frame having two supplemental threaded fastening elements located at the side walls of said frame; said fastening elements being located as the corners of a square and accessible at said frame opening; a bracket having a substantially square peripheral configuration for overlying said edges; four companion threaded fastening members cooperable with said bracket and said fastening elements for securing said bracket in a selected angular position about the center of the said square; and a cover for overlying said edges and cooperable with said bracket for closing said opening, said cover having a part clamped in place by said bracket.

10. In a variable ratio transmission having a driving shaft and a driven shaft parallel to and spaced from the driving shaft, variable diameter pulley structures mounted on the shaft and belt means connecting the pulley structures: a frame having peripheral walls encompassing both of said shafts, said peripheral walls including side wall portions and top and bottom wall portions; said wall portions having edges defining an opening at one end of the frame for access to the pulley structures of both shafts; said frame having an end wall opposite the opening; said end wall having means for supporting a driving motor in alignment with the driving shaft; said frame having two threaded fastening elements located at the corners of the frame at the juncture of the bottom wall portion and the side wall portions, said frame having two supplemental threaded fastening elements located at the side walls of said frame; said fastening elements being located as the corners of a square and accessible at said frame opening; a bracket having a substantially square peripheral configuration for overlying said edges; four companion threaded fastening members cooperable with said bracket and said fastening elements for securing said bracket in a selected angular position about the center of the said square; a cover for overlying said edges and cooperable with said bracket for closing said opening, said cover having a part clamped in place by aid bracket; said bracket having a bearing cup located so as to fall at the center of said square irrespective of the selected angular position of said bracket.

11. In a variable ratio transmission having a driving shaft and a driven shaft parallel to and spaced from the driving shaft; variable diameter pulley structures mounted on the shaft, and belt means connecting the pulley structures: a moldable frame having peripheral walls encompassing both of said shafts; said frame having edges defining an opening at one end of the frame for access to the pulley structures of both shafts; said frame having an end wall opposite the opening that is integral with said peripheral walls; a bearing bracket; and fasteners clamping said bearing bracket to said frame edges, some of said fasteners being attached to the frame at preselected locations and closely fitting the bearing bracket to act as locating dowels therefor; said bearing bracket having a bearing cup the axis of which is accurately located with respect to said frame by said fasteners.

12. In a variable ratio transmission having a driving shaft and a driven shaft parallel to and spaced from the driving shaft; variable diameter pulley structures mounted on the shaft, and belt means connecting the pulley structures: a moldable frame having peripheral walls encompassing both of said shafts; said frame having edges defining an opening at one end of the frame for access to the pulley structure of both shafts; said frame having an end wall opposite the opening that is integral with said peripheral walls; a bearing bracket; fasteners clamping said bearing bracket to said frame edges, some of said fasteners being attached to the frame at preselected locations and closely fitting the bearing bracket to act as locating dowels therefor; said bearing bracket having a bearing cup the axis of which is accurately located with respect to said frame by said fasteners; and a separate mounting base having mounting provisions and a pad upon which the bottom wall portion or either side wall portion of the frame may rest for optional mounting of the frame; said wall portions having a taper corresponding to mold draft; said pad having a compensating taper whereby the mounting provisions of the base parallel the shafts.

13. In a variable ratio transmission having a driving shaft and a driven shaft parallel to and spaced from the driving shaft, variable diameter pulley structures mounted on the shaft and belt means connecting the pulley structures: a moldable frame having peripheral walls encompassing both of said shafts, said peripheral walls including side wall portions and top and bottom wall portions; said wall portions having edges defining an opening at one end of the frame for access to the pulley structures of both shafts; said frame having an end wall opposite the opening which is integral with said peripheral walls; said end wall having means for supporting a driving motor in alignment with the driving shaft; said peripheral wall having four bosses provided with apertures located at corners of a square with the center of the square intersected by the axis of the driven shaft; two of said bosses being located at the lower corners of the frame; a bearing bracket having a flange adapted to engage said edges and having four apertures adapted to be aligned with the apertures of said bosses; and fasteners passing through the apertures of said bearing bracket and engaging the apertures of said bosses; one of said apertures of said bracket being surrounded by a bracket part providing a bore closely fitting the corresponding fastener; another aperture of the bracket diagonally opposite said one aperture being elongated along a line passing both through the center of the square defined by said apertures of said bracket and the center of said one aperture; said other apertures having a size for closely fitting the corresponding fastener on opposite sides; all of the apertures of the bosses being accurately located for cooperation with said fasteners; said bracket having a bearing cup with its center coincident with the center of said square.

14. In a variable ratio transmission having a driving shaft and a driven shaft parallel to and spaced from the driving shaft, variable diameter pulley structure mounted on the shaft and belt means connecting the pulley structures: a moldable frame having peripheral walls encompassing both of said shafts, said peripheral walls including side wall portions and top and bottom wall portions; said wall portions having edges defining an opening at one end of the frame for access to the pulley structures of both shafts; said frame having an end wall opposite the opening which is integral with said peripheral walls; said end wall having means for supporting a driving motor in alignment with the driving shaft; said peripheral wall having four bosses provided with apertures located at corners of a square with the center of the square intersected by the axis of the driven shaft; two of said bosses being located at the lower corners of the frame; a bearing bracket having a flange adapted to engage said edges and having four apertures adapted to be aligned with the apertures of said bosses; fasteners passing through the apertures of said bearing bracket and engaging the apertures of said bosses; one of said apertures of said bracket being surrounded by a bracket part providing a bore closely fitting the corresponding fastener; another aperture of the bracket diagonally opposite said one aperture being elongated along a line passing both through the center of the square defined by said apertures of said bracket and the center of said one aperture; said other aperture having a size for closely fitting the corresponding fastener on opposite sides; all of the apertures of the bosses being accurately located for cooperation with said fasteners; said bracket having a bearing cup with its center coincident with the center of said square; and a separate mounting base having a pair of apertured ears, adapted to be aligned with a selected two of said apertured bosses for optional mounting of said frame to said base; two of said fasteners having provisions for securing aid ears; said bracket flange having openings to permit passage of said mounting ears.

15. In a variable ratio transmission having a driving shaft and a driven shaft parallel to and spaced from the driving shaft, variable diameter pulley structures mounted on the shaft and belt means connecting the pulley structures: a moldable frame having peripheral walls encompassing both of said shafts, said peripheral walls including side wall portions and top and bottom wall portions; said wall portions having edges defining an opening at one end of the frame for access to the pulley structures of both shafts; said frame having an end wall opposite the opening which is integral with said peripheral walls; said end wall having means for supporting a driving motor in alignment with the driving shaft; said peripheral wall having four bosses provided with apertures located at corners of a square with the center of the square intersected by the axis of the driven shaft; two of said bosses being located at the lower corners of the frame; a bearing bracket having a flange adapted to engage said edges and having four apertures adapted to be aligned with the apertures of said bosses; fasteners passing through the apertures of said bearing bracket and engaging the apertures of said bosses; one of said apertures of said bracket being surrounded by a bracket part providing a bore closely fitting the corresponding fastener; another aperture of the bracket diagonally opposite said one aperture being elongated along a line passing both through the center of the square defined by said apertures of said bracket and the center of said one aperture; said other aperture having a size for closely fitting the corresponding fastener on opposite sides; all of the apertures of the bosses being accurately located for cooperation with said fasteners; said bracket having a bearing cup with its center coincident with the center of said square; a separate mounting base having a pair of apertured ears, adapted to be aligned with a selected two of said apertured bosses for optional mounting of said frame to said base; two of said fasteners having provisions for securing said ears; said bracket flange having openings to permit passage of said mounting ears; and a cover member cooperating with said bracket to close said flange opening, said cover member having a part clamped by that part of the bracket flange that extends across said frame opening.

References Cited by the Examiner

UNITED STATES PATENTS

| | | | |
|---|---|---|---|
| 2,215,742 | 9/1940 | Reeves | 74—230.17 |
| 2,277,004 | 3/1942 | Reeves | 74—230.17 |
| 2,433,150 | 12/1947 | Palm | 74—230.17 |

DON A. WAITE, *Primary Examiner.*